United States Patent
Tan et al.

(10) Patent No.: US 10,970,586 B2
(45) Date of Patent: Apr. 6, 2021

(54) SYSTEMS AND METHODS OF 3D SCENE SEGMENTATION AND MATCHING FOR ROBOTIC OPERATIONS

(71) Applicant: General Electric Company, Schenectady, NY (US)

(72) Inventors: Huan Tan, Clifton Park, NY (US); Gyeong Woo Cheon, Niskayuna, NY (US); Jilin Tu, Santa Clara, NY (US); Li Zhang, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 37 days.

(21) Appl. No.: 16/022,160

(22) Filed: Jun. 28, 2018

(65) Prior Publication Data
US 2020/0005072 A1    Jan. 2, 2020

(51) Int. Cl.
*G06K 9/46*      (2006.01)
*B25J 9/16*      (2006.01)
(Continued)

(52) U.S. Cl.
CPC .......... *G06K 9/4609* (2013.01); *B25J 9/1671* (2013.01); *B25J 9/1697* (2013.01); *G06F 16/583* (2019.01);
(Continued)

(58) Field of Classification Search
CPC ..... G06F 16/583; B25J 9/1671; B25J 9/1697; G05B 2219/40564; G06T 7/0004;
(Continued)

(56) References Cited

U.S. PATENT DOCUMENTS

| 8,630,456 B2 | 1/2014 | Asagara et al. |
| 8,830,229 B2 | 9/2014 | Drost et al. |

(Continued)

FOREIGN PATENT DOCUMENTS

CN      104915957 B      10/2017

OTHER PUBLICATIONS

Bircher et al. "Structural inspection path planning via iterative viewpoint resampling with application to aerial robotics." 2015 IEEE International Conference on Robotics and Automation (ICRA). IEEE, 2015. (Year: 2015).*

(Continued)

*Primary Examiner* — Katrina R Fujita
(74) *Attorney, Agent, or Firm* — Fletcher Yoder, P.C.

(57) ABSTRACT

A method and system, the method including receive image data representations of a set of images of a physical asset; receive a data model of at least one asset, the data model of each of the at least one assets including a semantic description of the respective modeled asset and at least one operation associated with the respective modeled asset; determine a match between the received image data and the data model of one of the at least one assets based on a correspondence therebetween; generate, for the data model determined to be a match with the received image data, an operation plan based on the at least one operation included in matched data model; execute, in response to the generation of the operation plan, the generated operation plan by the physical asset.

15 Claims, 5 Drawing Sheets

(51) Int. Cl.
*G06K 9/00* (2006.01)
*G06F 16/583* (2019.01)
*G06T 7/00* (2017.01)

(52) U.S. Cl.
CPC ........ *G06K 9/00214* (2013.01); *G06T 7/0004* (2013.01); *G06T 2207/30108* (2013.01); *G06T 2207/30184* (2013.01)

(58) Field of Classification Search
CPC ........... G06T 2207/30108; G06T 2207/30184; G06K 9/00214; G06K 9/4609; G06K 9/6215; G06K 9/6277
See application file for complete search history.

(56) References Cited

U.S. PATENT DOCUMENTS

| | | | |
|---|---|---|---|
| 9,002,098 | B1 | 4/2015 | Chelian et al. |
| 9,098,773 | B2 | 8/2015 | Huang et al. |
| 9,513,635 | B1* | 12/2016 | Bethke ................ G01C 21/20 |
| 9,868,212 | B1 | 1/2018 | Hinterstoisser |
| 2015/0148949 | A1* | 5/2015 | Chin ........................ B05D 1/02 700/245 |
| 2016/0253808 | A1* | 9/2016 | Metzler ................ G01C 15/00 382/103 |
| 2017/0046571 | A1* | 2/2017 | Wnuk ................ G06K 9/00671 |
| 2017/0193699 | A1 | 7/2017 | Mehr et al. |
| 2017/0329307 | A1* | 11/2017 | Castillo-Effen ........ B25J 9/1697 |
| 2018/0144644 | A1* | 5/2018 | Heinonen ............ G08G 5/0086 |
| 2018/0259955 | A1* | 9/2018 | Noto .................... G05D 1/0011 |
| 2018/0329904 | A1* | 11/2018 | Gupta .................... G06Q 10/20 |
| 2019/0145902 | A1* | 5/2019 | Tan .................... G01N 21/8851 702/35 |
| 2019/0188521 | A1* | 6/2019 | Barzelay ............. G06K 9/6202 |
| 2019/0204123 | A1* | 7/2019 | Zhao .................... G01C 21/20 |

OTHER PUBLICATIONS

Cacace et al. "Aerial service vehicles for industrial inspection: task decomposition and plan execution." Applied Intelligence 42.1 (2015): 49-62. (Year: 2015).*

Giglio et al. "Selective compliance control for an unmanned aerial vehicle with a robotic arm." 22nd Mediterranean Conference on Control and Automation. IEEE, 2014. (Year: 2014).*

Ortiz et al. "Vision-based corrosion detection assisted by a micro-aerial vehicle in a vessel inspection application." Sensors 16.12 (2016): 2118. (Year: 2016).*

Asif, Umar et al., "Real-time Pose Estimation of Rigid Objects using RGB-D Imagery", 2013 IEEE 8th Conference on Industrial Electronics and Applications (ICIEA), Melbourne, Jun. 19-21, 2013, (pp. 1692-1699, 8 total pages).

Ren, Xiaofeng et al., "Change Their Perception: RGB-D for 3-D Modeling and Recognition", IEEE Robotics & Automation Magazine, vol. 20, Issue: 4, Dec. 2013, DOI:10.1109/MRA.2013.2253409, (pp. 49-59, 11 total pages).

* cited by examiner

SYSTEMS AND METHODS OF 3D SCENE SEGMENTATION AND MATCHING FOR ROBOTIC OPERATIONS

BACKGROUND

The present disclosure relates, generally, to robot assisted operations and, more specifically, to object recognition and task planning aspects in an operations planning and execution pipeline inspection process.

Robot assisted operations including but not limited to inspections and manipulations of the robots may require locating target objects of interest in the environment and segmenting the object from the environment. Recognizing an object in a real-world environment can be a complex undertaking. In order to be useful, the recognition needs to be performed quickly, efficiently, and reliably. Furthermore, once an object is recognized, the robot may need to interact with the object to accomplish a specific task, such as lifting the object, painting the object, rotating the object, etc. Enabling the robot to interact with the object in specific manner or plan appropriate for the object in the environment to accomplish a desired task is often a complex problem for a robot, particularly in a fast and efficient manner.

Therefore, a system and a method that will address the foregoing issues is desirable that can efficiently determine objects and determine a plan for interacting with the objects in the object's natural environment.

DESCRIPTION OF THE DRAWINGS

These and other features and aspects of embodiments of the present disclosure will become better understood when the following detailed description is read with reference to the accompanying drawings, in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
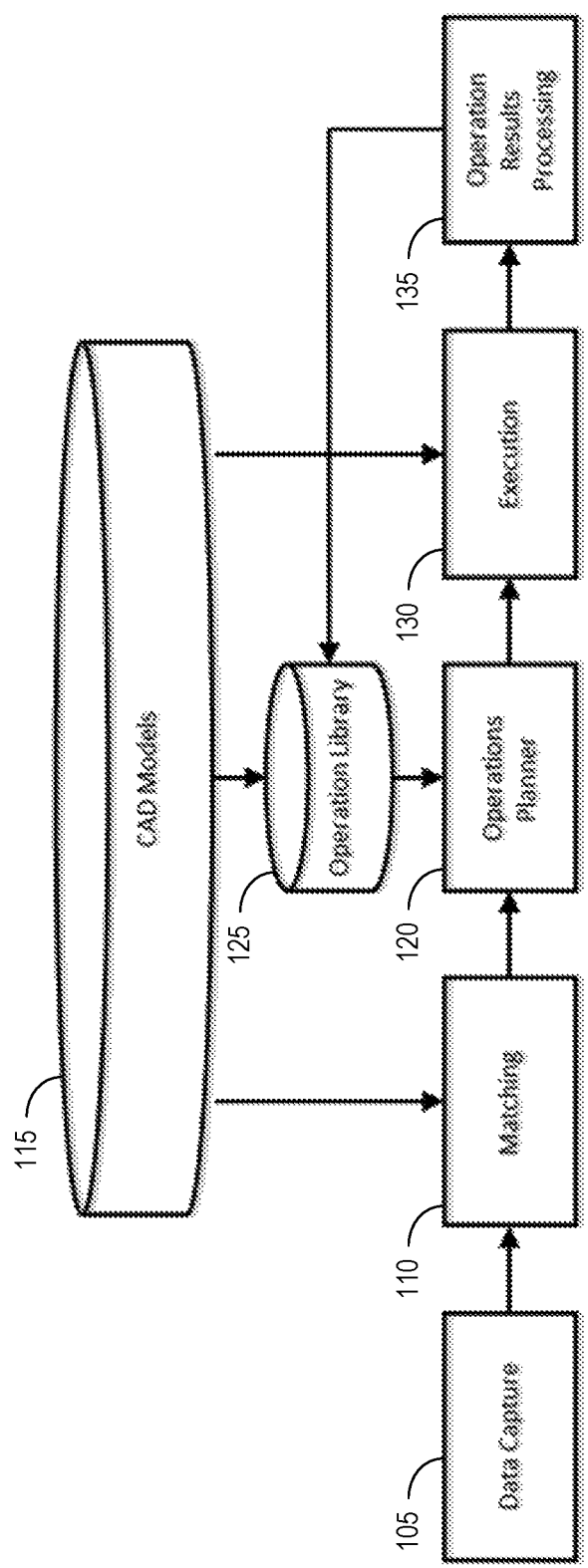
FIG. 1 is an illustrative example of a schematic block diagram of a system, according to some embodiments.

FIG. 1 is an illustrative example of a schematic block diagram of a system or architecture 100 for a machine such as, for example, an autonomous or semi-autonomous robot, to perform task(s) in an efficient and reliable manner. In some embodiments, system 100 may provide, support, or facilitate an improved process for a robot or other machine to perform tasks, including a sequence of tasks or operations. In some aspects, system 100 provides two major functions, including (1) target recognition and (2) operation planning. Both of these aspects are at least enhanced by the use of a predefined data model of an asset, where the data model includes pre-define association(s) of operations to be executed by a machine (e.g., a robot).

System 100 may be implemented by a machine having a memory and processor, where the processor can execute program instructions stored in the memory to complete one or more tasks specified in the program instructions. Additionally, the machine may have a number of sensors associated therewith, where the sensors might be integrated into the machine or otherwise interfaced with the machine via a communication channel. The sensors are used to collect sensory data of an asset (i.e., object) from the environment and comprise data capture module 105. In an example of FIG. 1, the sensors capture an image of an asset in the environment and may include RGB (red, green, blue color model) cameras to capture one or more images (i.e., a set) of a physical asset in the environment. In some embodiments, RGB cameras and other types of imaging devices may be used, particularly devices whose image data representations of the physical asset can be processed relatively fast.

In some embodiments, data capture module 105 may perform at least some pre-processing of the images captured by the sensors therein using the resources associated with the sensors. In some instances, the pre-processing of the image data might facilitate a transmission and/or processing of the data by a device, system, processing module, or service.

The image data representations of the captured images of the physical asset (i.e., image data) captured by data capture module 105 is transmitted to a processing system, device, or service including a matching module 110 that performs further processing of the image data, as shown in FIG. 1. In some embodiments, the image data may be compressed prior to the transmission thereof, according to known and future developed compression (encrypted or unencrypted) techniques achieving different compression ratios. The captured image data may be transmitted to the device, system, or service using any wired or wireless communication protocol, now known or developed in the future. In some aspects, the device, system, and service to which the captured image data is transmitted to might include a local workstation, (e.g., a laptop, a desktop computer, a handheld computing device, etc.), a cloud server, and other processing systems. In some embodiments, a server may be used to broadcast the captured image data to multiple devices instantiating consumers subscribing to the image data.

In general, matching module 110 receives the image data from data capture module 105. Matching module 110 also receives a data model of at least one asset from a data source 115 of data models. Data source 115 may be a data store, a database, a data warehouse, and other data facilities and sources capable of providing access to data stored or served thereby. Data store 115 (e.g., database) may store a large knowledge base or dataset of data ("big data") including data models. In some instances, the dataset may include a massive amount of data regarding an organization and its processes and operations, including past and present.

Each data model of an asset herein may include a detailed description of a particular asset, including descriptions of the geometrical shape of the asset. In some embodiments, the detailed description of the asset is represented as a semantic description including word(s) descriptive of the asset at a high level of descriptiveness (i.e., to sufficiently and distinctively describe the asset to distinguish it from other assets). In some embodiments, the data model may describe other details in addition to the geometrical features of the asset, including, for example, physical attributes such as its mass, color, overall shape, the location of grasp/hold/lift points, etc. The semantic description of a data model of an asset herein may also include at least one operation associated with the asset. As used herein, the at least one operation is an action to be performed by a machine. For example, the operation may include a lifting action, a grasping action, a turning action, and other actions to be performed or executed by a machine. The significance of the at least one action associated with an asset being included in the data model of the asset will be discussed in greater detail below.

Referring again to FIG. 1, matching module 110 receives the image data from data capture module 105 and receives a data model of at least one asset from data store 115. Based on these received inputs, matching module 110 processes the image data and the data model(s) to determine a match between the physical asset represented by the image data and one of the data models. In this manner, data models previously defined and stored with highly descriptive semantic descriptions of a subject asset may be accessed and used to quickly, reliably, and efficiently recognize a physical asset represented by image data by determining a correspondence or match between the image data and the data model. In some embodiments, a correspondence or match between the image data and the data model may be confirmed based on a correlation or matching of features extracted from the image data and features described in the data model. Different techniques may be used for the extracting of features from the image data, to the extent such techniques are compatible with other aspects of the present disclosure.

Upon determination of a data model matching the physical asset represented by the image data by matching module 110, an indication of the data model may be provided to operation planner 120. Operations planner 120 may then proceed to develop an operation (i.e., action) plan specifying one or more operations to be executed by the asset (i.e., machine) to accomplish a desired task(s) based on the at least one operation included in the data model matched with the image data by matching module 110. In some instances, the desired task(s) may be accomplished by a plurality of operations associated with the data model. Information or knowledge regarding the operation(s) associated with the matched data model may be obtained from operation library 125 based on an indication of the operation(s) included in the data model. The information or knowledge regarding the operation(s) received from operation library 125 may be used by operations planner 120 to construct an operation plan specifying operation(s) or job(s) to be executed by the physical asset at 130 in order to accomplish the desired task(s). The desired task(s) might include, for example, controlling a robot's grippers, manipulators, and other actuators in a particular sequence as specified by the operation plan.

Execution 130 of the operation plan may be monitored to assess compliance and adherence of the physical asset's behavior and actions with the prescribed operations specified in the operation plan. In some embodiments, one or more sensors associated with the asset may be used to obtain data (e.g., image data of the asset during and/or after the execution of the operation plan) used to assess the performance of the asset. In some embodiments, results of the execution of the operation plan may be quantified, and a value associated with the physical asset's performance can be provided to operation results processing module 135.

Proceeding further, the quantified results may be used to update and inform operation library 125 so that, in some embodiments, a new, modified, revised, or updated operation plan might be implemented to improve a performance of the physical asset in accomplishing the desired task(s) based on an operation plan generated based on operations associated with the data model of the asset. In some aspects, an accuracy and reliability of an operation plan generated for execution by the physical asset may be confirmed by the feed back of quantified results to operation library 125. In this manner, system 100 is a closed loop system.

Figure 2:
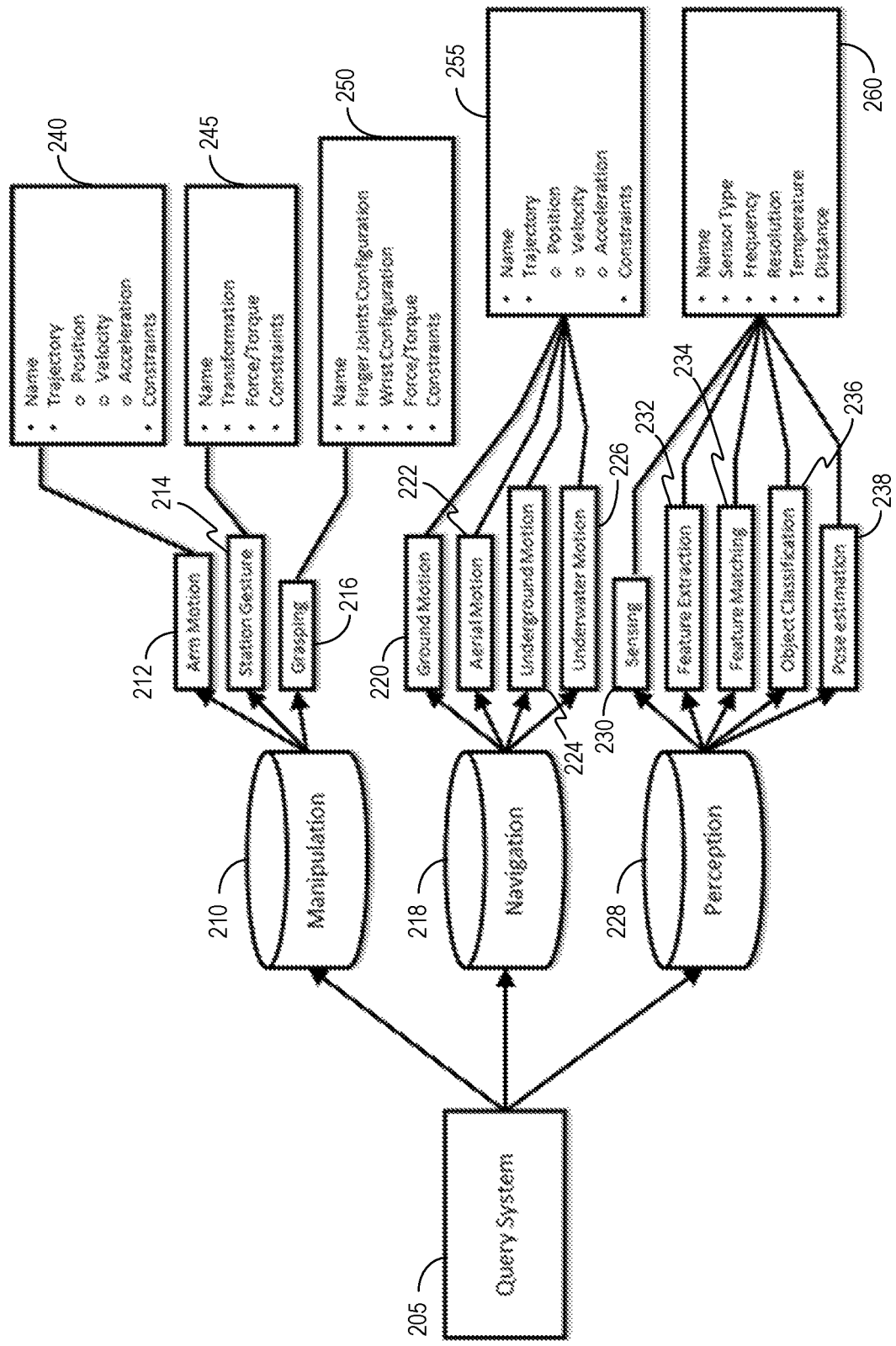
FIG. 2 is an illustrative schematic block diagram of a query system for an operation library, according to some embodiments.

FIG. 2 is an illustrative depiction of a logical structure 200 of an operation library (e.g., FIG. 1, 125), in some embodiments herein. In some embodiments, an operation library may be implemented by a database. The database may be embodied in a centralized or a distributed database, a relational database, an object-oriented database, a graphical database, and other models and schemas, where data associated with the database might be stored on disks and/or in-memory, completely or partially. Referring to FIG. 2, operation library includes a query system 205. Query system 205 may comprise a database management system in some embodiments configured to store, manage, and analyze the operation library related data. In an example of FIGS. 1 and 2, the operation library related data includes operations associated with asset data models. The operations associated with a data model herein may be categorized into one or more different categories. In the example of FIG. 2, the operations are arranged into a manipulation category operation 210, a navigation operation category 218, and a perception operation category 228. Each of the categories 210, 218, and 228 have a number of attributes associated therewith that further define each type of operation based on values assigned to the various attributes. For example, a manipulation operation may have the attributes of an arm motion 212, a station gesture 214, and grasping 216; a navigation operation may have associated attributes of a ground motion 220, an aerial motion 222, an underground motion 224, and an underwater motion 226; and a perception operation might have the attributes of sensing 230, feature extraction 232, feature matching 234, object classification 236, and pose estimation 238. These and/or other attributes may be associated with the different categories of illustrative, example operations 210, 218, and 228. Each of the attributes associated with an operation in operation library 200 may have parameters associated therewith as illustrated. As shown in the example of FIG. 2, attribute 212 includes parameters 240, attribute 214 includes parameters 245, and attribute 216 includes parameters 250. Likewise, attributes 220-226 include parameters 250 and attributes 230-238 include parameters 260. Each of the parameters may be assigned specific values, including a range of values in some instances, to define the operations (e.g., 210, 218, and 228) of operation library 200.

Referring to FIGS. 1 and 2 in combination, once a matched data model is determined (i.e., recognized) as corresponding to a particular physical asset of interest, the matched data model including its associated semantic description of the data model and (indication of) at least one associated operation may be provided to operation library (FIG. 1, 125; FIG. 2, 200) where query system 205 queries the database (e.g., using a query language such as SQL, etc.) for the specific operations specified in the data model. In some embodiments, search terms used in the query by query system 205 may be parsed from the semantic description associated with the matched data model. Results of the query including specific values and data related to the operation(s) specified for the asset by the matched data model may be provided to an operation planner (e.g., FIG. 1, 120) Operation planner 120 provides a solution to perform a task by the asset using a sequence of operations specified by the query results, where the operations are defined by the pre-planned operations stored in the operation library (e.g., FIG. 1, 125).

In some embodiments herein, operations (e.g., FIG. 2, 210, 218, and 228) in the operation library may have one or more environmental constraints incorporated therein, to account for, at least to some extent, environmental realities a physical asset might encounter in the real world. In some embodiments, an implementation of an operation planner (e.g., FIG. 1, 120) might determine an operation that considers environmental constraints. In such cases, the resulting operation plan may include operations or at least the environmental constraints specified by a particular operation. If an operation planner or planning scheme used thereby does not, in a particular instance, consider environmental constraints, then the operation planner might not include operations or at least the environmental constraints specified by a particular operation in an operation plan.

Figure 3:
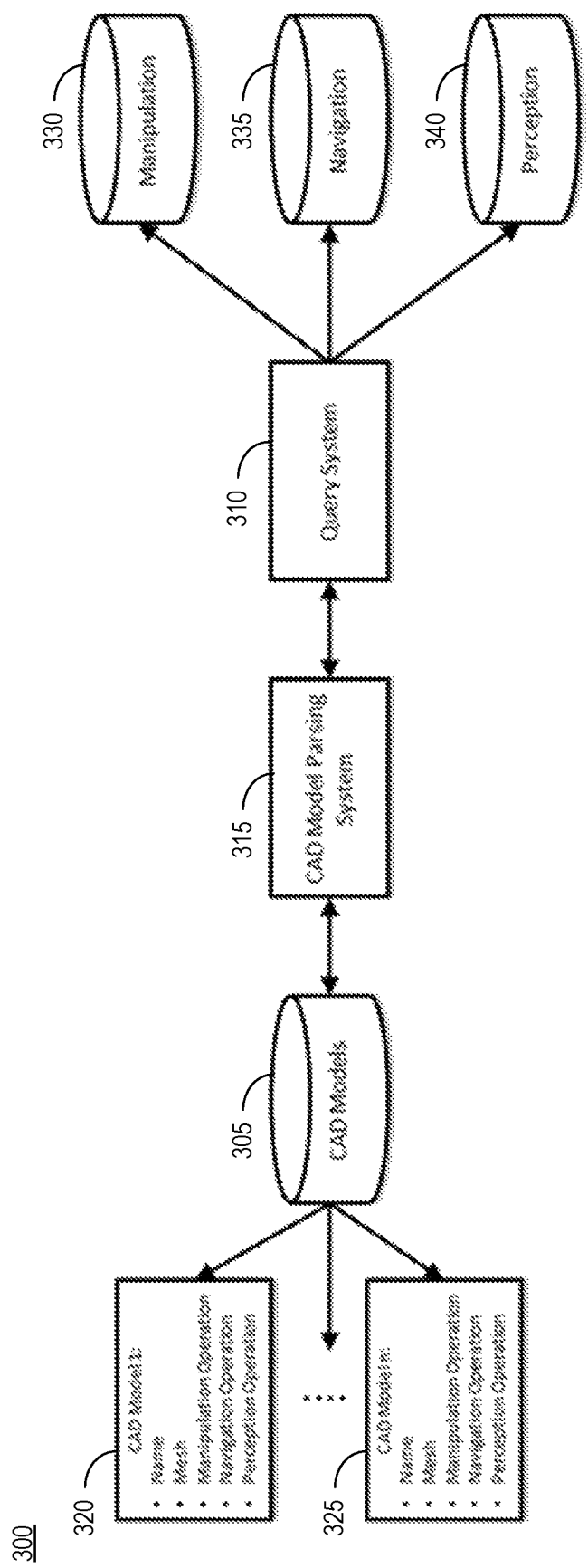
FIG. 3 is an illustrative schematic logical block diagram of a system relating to some aspects of asset data models and an operation library, according to some embodiments.

FIG. 3 is a depiction of an example architecture or platform 300 including logical connections between data models and an operation library, in some embodiments herein. FIG. 3 might correspond to some aspects discussed in connection with FIG. 1 and FIG. 3. Accordingly, some details related to FIG. 3 may be understood by referring to FIGS. 1, 3 and the discussions thereof above and will not be repeated here. As shown, platform 300 includes a database or other data store 305 storing data models and a query system 310. As discussed in conjunction with FIG. 1, data models herein each have a semantic description associated therewith as illustrated by the listings of details shown for each of data models 320 and 325. As discussed in conjunction with FIG. 2, query system 310 provides search services for querying pre-defined operations 330, 335, and 340. Data model parsing system 315 operates to parse the semantic description of a data model determined from a plurality of data models 320-325 and provide semantic terms to query system 300 which, in turn, uses the terms parsed from the semantic description as search terms to query the operations 330, 335, 340 in the operation library.

Figure 4:
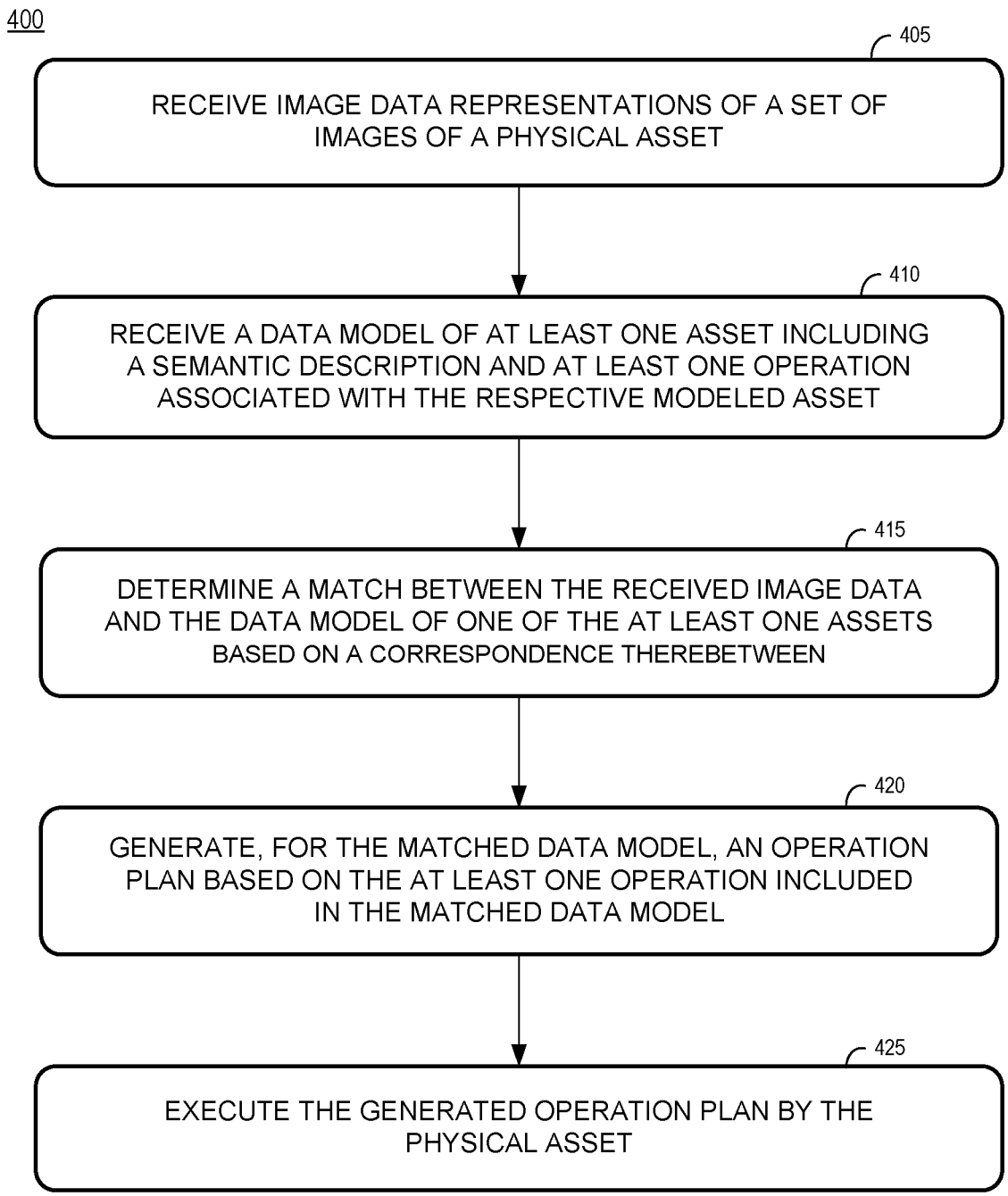
FIG. 4 is an illustrative flow diagram of a process, according to some embodiments.

FIG. 4 is an illustrative flow diagram of a process 400, in accordance with some embodiments herein. Process may be similar in some aspects to some of the features and embodiments disclosed in the discussion of systems 100, 200, and 300 and processes associated therewith. Accordingly, process 400 may be fully understood in combination with the discussions of systems 100, 200, and 300, and similar aspects might not be repeated in detail here.

At operation 405, a system, device, or service receives image data representation of a first set of images capturing images of a physical asset. The image data may correspond to a plurality or set of images of the physical asset. In some embodiments herein, the first set of images may include images of the physical asset captured from multiple different view-angles.

At operation 410, a data model of at least one asset, including a data structure representation thereof, is received. Typically, a plurality of data models are received, where access is granted to the plurality of data models stored in a data store. Each of the data models includes a semantic description and at least one operation associated with the data model.

At operation 415, a match is determined regarding the image data of the physical asset and the data model of one of the assets modeled. The matching between the image data and a specific data model is based on an analysis of corresponding features of the image data and the data model.

Operation 420 includes the generation of an operation plan based on the at least one operation associated with the matched data model determined at operation 415. At operation 425, the operation plane generated at operation 420 may be executed by the physical asset corresponding to the image data received at operation 405.

Figure 5:
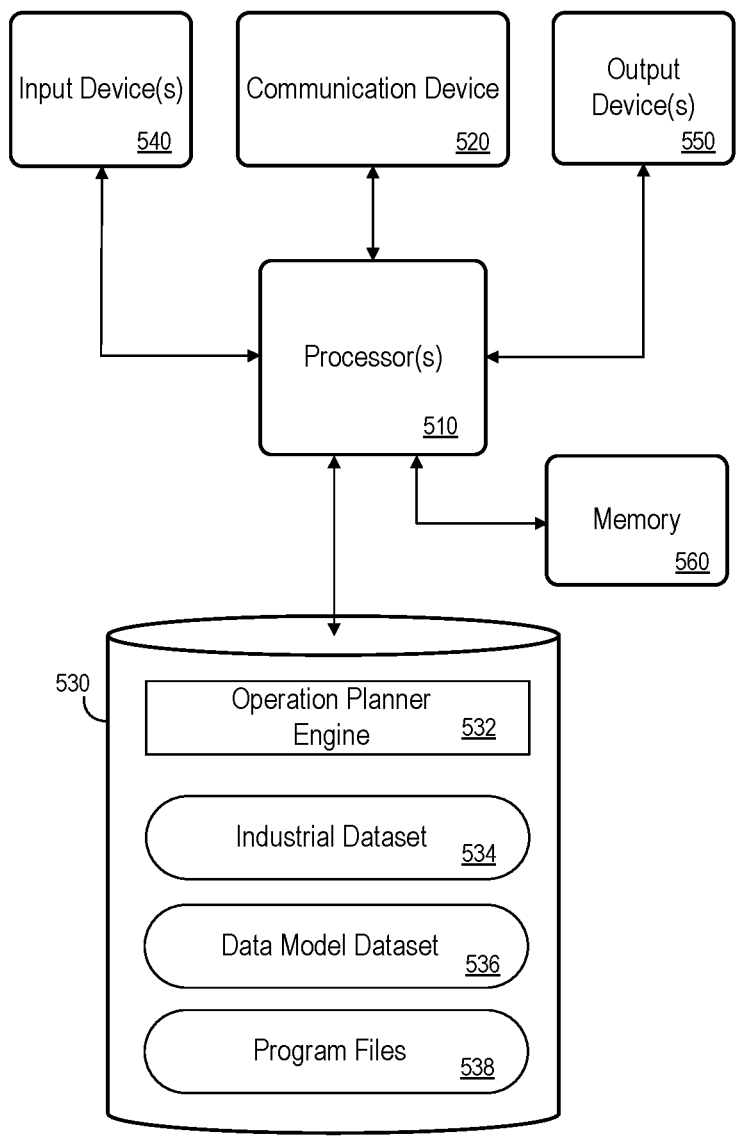
FIG. 5 is a block diagram of an apparatus, according to some embodiments.

FIG. 5 is a block diagram of computing system 500 according to some embodiments. System 500 may comprise a general-purpose or special-purpose computing apparatus and may execute program code to perform any of the methods, operations, and functions described herein. System 500 may comprise an implementation of one or more systems (e.g., systems 100, 200, and 300) and processes (e.g., 400). System 500 may include other elements that are not shown, according to some embodiments.

System 500 includes processor(s) 510 operatively coupled to communication device 520, data storage device 530, one or more input devices 540, one or more output devices 550, and memory 560. Communication device 520 may facilitate communication with external devices, such as a data server and other data sources. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to enter information into system 500. Output device(s) 550 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 560 may comprise Random Access Memory (RAM), Storage Class Memory (SCM) or any other fast-access memory.

Operation planner engine 532 may comprise program code executed by processor(s) 510 (and within the execution engine) to cause system 500 to perform any one or more of the processes described herein. Embodiments are not limited to execution by a single apparatus. Data model dataset 534 may comprise a knowledge base associated with one or more data models of industrial assets, according to some embodiments. Operation library dataset 536 may comprise a knowledge base associated with one or more operations defining actions associated with specific data models, according to some embodiments. Data storage device 530 may also store data and other program code 538 for providing additional functionality and/or which are necessary for operation of system 500, such as device drivers, operating system files, etc.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

This written description uses examples to explain the disclosure, including the best mode, and also to enable any person skilled in the art to practice the disclosure, including making and using any devices or systems and performing any incorporated methods. The patentable scope of the disclosure is defined by the claims appended hereto, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system, comprising:
   a memory storing executable program instructions therein; and
   a processor in communication with the memory, the processor operative to execute the program instructions to:
      receive image data comprising a set of images of a physical asset;
      receive data models of a plurality of assets, wherein each of the data models includes a semantic description of a respective asset, and wherein the semantic description includes at least one operation associated with the respective asset;
      determine a match between the physical asset represented in the image data and a corresponding data model of the data models;
      generate, upon determining the match between the physical asset and the corresponding data model, an operation plan based on a corresponding operation included in the corresponding data model;
      execute the operation plan via a robot configured to interact with the physical asset;
      quantify a result of execution of the operation plan by the robot;
      update the corresponding operation included in the corresponding data model based on the result to generate an updated operation associated with the corresponding data model and different than the corresponding operation; and
      store the updated operation in an operation library.

2. The system of claim 1, wherein determining the match between the physical asset represented in the image data and the corresponding data model comprises:
   extracting features from the image data; and
   comparing the features extracted from the image data with features of the corresponding data model.

3. The system of claim 1, wherein the at least one operation comprises a plurality of categories of operations.

4. The system of claim 3, wherein the plurality of categories of operations comprises a manipulation operation defining how the robot operates and moves a manipulator, a navigation operation defining how the robot moves relative to another entity, and a perception operation defining how the robot obtains and processes sensory information.

5. The system of claim 1, wherein generating the operation plan based on the corresponding operation comprises:
   extracting search terms from the semantic description associated with the corresponding data model; and
   querying a database using the search terms for identification of operations to be executed by the robot configured to perform a task on the physical asset.

6. A computer-implemented method comprising:
   receiving image data comprising a set of images of a physical asset;
   receiving data models of a plurality of assets, wherein each of the data models includes a semantic description of a respective asset, and wherein the semantic description includes at least one operation associated with the respective asset;
   determining a match between the physical asset represented in the image data and a corresponding data model of the data models;
   generating, upon determining the match between the physical asset and the corresponding data model, an operation plan based on a corresponding operation included in the corresponding data model;
   executing the operation plan via a robot configured to interact with the physical asset;
   quantifying a result of execution of the operation plan by the robot;
   updating the corresponding operation included in the corresponding data model based on the result to generate an updated operation associated with the corresponding data model and different than the corresponding operation; and
   storing the updated operation in an operation library.

7. The computer-implemented method of claim 6, wherein determining the match between the physical asset represented in the image data and the corresponding data model comprises:
   extracting features from the image data; and
   comparing the features extracted from the image data with features of the corresponding data model.

8. The computer-implemented method of claim 6, wherein the at least one operation comprises a plurality of categories of operations.

9. The computer-implemented method of claim 8, wherein the plurality of categories of operations comprises a manipulation operation defining how the robot operates an actuator, a navigation operation defining how the robot can move relative to another entity, and a perception operation defining how the robot obtains and processes sensory information.

10. The computer-implemented method of claim 6, wherein generating the operation plan based on the corresponding operation comprises:
    extracting search terms from the semantic description associated with the corresponding data model; and
    querying a database using the search terms for identification of operations to be executed by the robot configured to perform a task on the physical asset.

11. A non-transitory computer readable medium having executable instructions stored therein, the non-transitory computer readable medium comprising:
    instructions to receive image data comprising a set of images of a physical asset;
    instructions to receive data models of a plurality of assets, wherein each of the data models includes a semantic description of a respective asset, and wherein the semantic description includes at least one operation associated with the respective asset;
    instructions to determine a match between the physical asset represented in the image data and a corresponding data model of the data models;
    instructions to generate, upon determining the match between the physical asset and the corresponding data model, an operation plan based on a corresponding operation included in the corresponding data model;
    instructions to execute the operation plan via a robot configured to interact with the physical asset;
    instructions to quantify a result of execution of the operation plan by the robot;
    instructions to update the corresponding operation included in the corresponding data model based on the result to generate an updated operation associated with the corresponding data model and different than the corresponding operation; and instructions to store the updated operation in an operation library.

12. The non-transitory computer readable medium of claim 11, wherein determining the match between the physical asset represented in the image data and the corresponding data model comprises:

extracting features from the image data; and comparing the features extracted from the image data with features of the corresponding data model.

13. The non-transitory computer readable medium of claim 11, wherein the at least one operation comprises plurality of categories of operations.

14. The non-transitory computer readable medium of claim 13, wherein the plurality of categories of operations comprises a manipulation operation defining how the robot operates an actuator, a navigation operation defining how the robot can move relative to another entity, and a perception operation defining how the robot obtains and processes sensory information.

15. The non-transitory computer readable medium of claim 11, wherein generating the operation plan based on the corresponding operation comprises:

extracting search terms from the semantic description associated with the corresponding data model; and querying a database using the search terms for identification of operations to be executed by the physical asset.

* * * * *